United States Patent

Blythe

(10) Patent No.: US 12,113,901 B2
(45) Date of Patent: Oct. 8, 2024

(54) AUTHENTICATION DEVICE, SYSTEM AND METHOD

(71) Applicant: MASTERCARD INTERNATIONAL INCORPORATED, Purchase, NY (US)

(72) Inventor: Simon Blythe, Ely (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 609 days.

(21) Appl. No.: 17/030,997

(22) Filed: Sep. 24, 2020

(65) Prior Publication Data

US 2021/0184851 A1    Jun. 17, 2021

(30) Foreign Application Priority Data

Oct. 31, 2019  (EP) ..................... 19206665

(51) Int. Cl.
*H04L 9/32*      (2006.01)
*H04L 9/08*      (2006.01)
*H04L 9/40*      (2022.01)

(52) U.S. Cl.
CPC ............ *H04L 9/321* (2013.01); *H04L 9/0827* (2013.01); *H04L 9/0866* (2013.01); *H04L 63/0428* (2013.01); *H04L 63/0861* (2013.01)

(58) Field of Classification Search
CPC ..... H04L 9/321; H04L 9/0827; H04L 9/0866; H04L 63/0428; H04L 63/0861; H04L 63/18
See application file for complete search history.

(56) References Cited

U.S. PATENT DOCUMENTS

| 8,661,254 B1* | 2/2014 | Sama ..................... H04L 63/18 |
| | | 713/168 |
| 9,608,970 B1* | 3/2017 | Gehret ..................... G07C 9/22 |
| 2008/0244721 A1* | 10/2008 | Barrus .................. H04L 9/0819 |
| | | 726/9 |
| 2009/0259848 A1* | 10/2009 | Williams .............. H04L 9/3228 |
| | | 713/168 |

(Continued)

FOREIGN PATENT DOCUMENTS

| WO | 2007117073 A1 | 10/2007 |
| WO | 2019026038 A1 | 2/2019 |

OTHER PUBLICATIONS

Extended European Search Report for European Patent Application No. 19206665.2, mailed Apr. 30, 2020, 10 pages.

*Primary Examiner* — Izunna Okeke
(74) *Attorney, Agent, or Firm* — Jordan IP Law, LLC

(57) ABSTRACT

The present invention relates to secure transmission and reception of electronic messages using an authentication device. The authentication device includes a light sensor that is used to scan a visual element displayed on a display of a user device in conjunction with an electronic message having an encrypted payload. The visual element encodes a unique identifier that the authentication device transmits to a server, receiving in response a cryptographic key stored in association with the unique identifier and usable to decrypt an encrypted payload of the electronic message. The authentication device can also generate encryption keys and corresponding unique identifiers suitable for encryption of payloads of electronic messages.

9 Claims, 6 Drawing Sheets

(56) References Cited

U.S. PATENT DOCUMENTS

2013/0136259 A1* 5/2013 Crook ............... G06Q 20/3823
                                                    380/243
2014/0223175 A1   8/2014 Bhatnagar
2014/0270801 A1   9/2014 Sleator

* cited by examiner

AUTHENTICATION DEVICE, SYSTEM AND METHOD

CROSS-REFERENCE TO RELATED APPLICATIONS

The present application claims priority to European Patent Application No. 19206665.2 (filed on Oct. 31, 2019), which is hereby incorporated by reference in its entirety.

FIELD

The present disclosure relates to methods and devices to improve cybersecurity when sending and receiving electronic messages, as well as, ensuring the authenticity of a sender on a received message.

BACKGROUND

Sending and receiving sensitive information over electronic messages can be a risky task. Computer systems are at risk to computer viruses, hackers, and eavesdropping devices. It is therefore important that sensitive content which a user wishes to send securely over a network be encrypted whilst minimising the ability of nefarious parties to compromise the security of the encryption.

It is an object of the present invention to provide a device, system, and method of encrypting and decrypting electronic messages to overcome, or at least ameliorate, this problem.

Furthermore, it is not always possible to be certain that a received electronic message is authentic, in other words, it is not always possible to be certain that an electronic message which has been received has been sent by the sender which the message claims to have been sent by. This is particularly important when an electronic message is received from a recognised authority such as a customer's bank.

In a situation where a nefarious party has been able to mimic a bank's electronic messaging signature, for example, an email address or telephone number, a customer receiving such an electronic message may perform an actions at their own detriment.

In many situations, it is therefore crucial to be able to ensure that a received email is authentic. The present invention provides a receiver of an electronic message a device, system, and method to ensure that the electronic message is authentic.

SUMMARY

According to a first aspect, there is provided an authentication device comprising: a light sensor; and a transmitter; wherein the authentication device is configured to: receive a unique identifier from a user device by sensing, with the light sensor, a visual element encoding the unique identifier that is displayed on a display of the user device; transmit, to a server, the unique identifier;

receive, from the server, a cryptographic key corresponding to the unique identifier; and transmit, with the transmitter to the user device, the cryptographic key for decryption of an electronic message corresponding to the unique identifier.

According to a second aspect, there is provided an authentication device comprising: a light sensor; and a transmitter; wherein the authentication device is configured to: receive a receiver's identification from a user device by sensing, with the light sensor, a visual element encoding the receiver's identification that is displayed on a display of the user device; generate a cryptographic key and unique identifier; transmit, with the transmitter to the user device, the unique identifier and the cryptographic key for encryption of an electronic message corresponding to the receiver's identification; and transmit, to a server, the cryptographic key, the unique identifier and the receiver's identification.

According to a third aspect, there is provided a computer-implemented method for encrypting an electronic message, comprising: receiving a receiver's identification at an authentication device from a user device by sensing, with a light sensor of the authentication device, a visual element of the electronic message that is displayed on a display of the network device, the visual element encoding the receiver's identification; generating, at the authentication device, a cryptographic key and a unique identifier; transmitting, by the authentication device, the cryptographic key and the unique identifier to the user device for encryption of the message; and transmitting, by the authentication device and over a secure channel, the cryptographic key, the unique identifier and the receiver's identification to a server.

According to a fourth aspect, there is provided a computer-implemented method for decrypting an electronic message, comprising: a) receiving a unique identifier from a user device by sensing, with a light sensor of the authentication device, a visual element of the electronic message that encodes the unique identifier and which is displayed on a display of the user device; b) transmitting the received unique identifier, by the authentication device, over a secure channel to a server; c) receiving, by the authentication device, a cryptographic key over the secure channel from the server, the cryptographic key corresponding to the unique identifier; and d) transmitting, by the authentication device, the cryptographic key to user network device for decryption of the electronic message.

Preferred aspects of the invention are set out in the appended dependent claims.

BRIEF DESCRIPTION OF THE FIGURES

Aspects of the present disclosure will now be described by way of example with reference to the accompanying figures. In the figures.

DETAILED DESCRIPTION OF THE FIGURES

Figure 1:
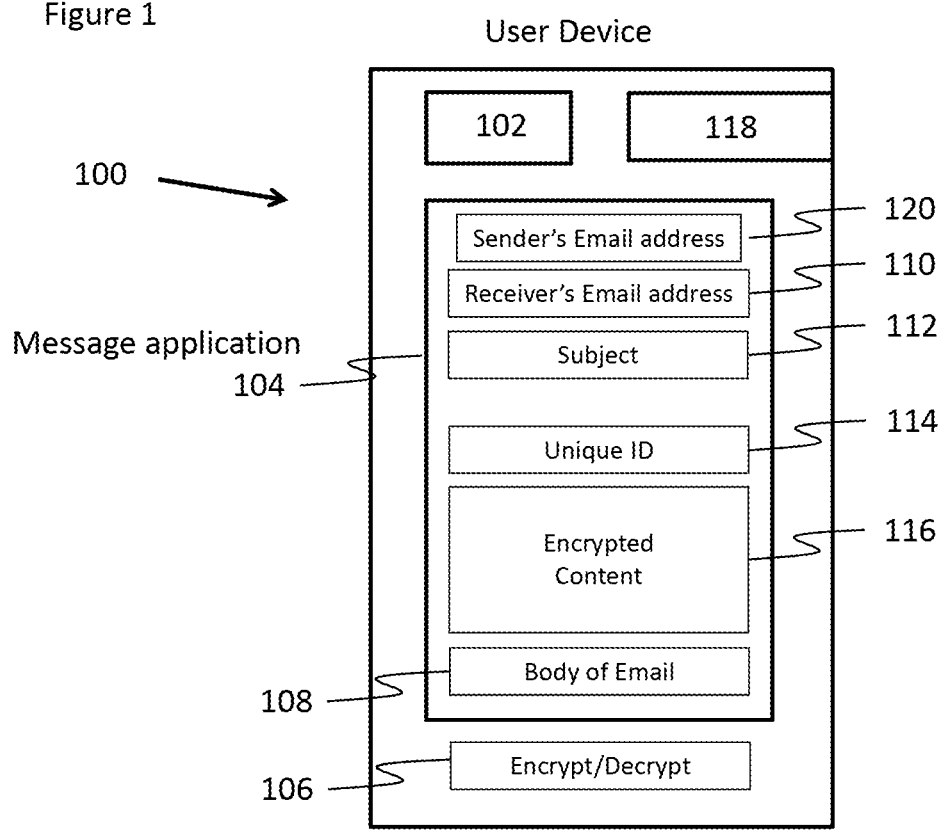
FIG. 1 is a block diagram illustrating a user device in accordance with exemplary embodiments.

The following description is presented to enable any person skilled in the art to make and use the system, and is provided in the context of a particular application. Various modifications to the disclosed embodiments will be readily apparent to those skilled in the art.

The systems and methods herein describe an authentication device (trusted device) for use in conjunction with a user device, such as a smartphone, tablet, laptop or PC. Here, the user is an entity seeking to send and/or receive an electronic message in a secure manner. The systems and methods described herein allow a user to utilize security protocols for methods of electronic communication, for example, email, or any other means of electronic communication.

Embodiments described herein prevent electronic messages such as emails being read in plaintext form without a sender's authentication being provided. Preferably the sender's authentication is based on one or more of Dynamic Data Authentication (DDA), Combined Data Authentication (CDA), and Static Data Authentication (SDA), with DDA and CDA being more secure than SDA.

A server involved in a message exchange between two parties can act as a certification authority with which senders and recipients are registered. The server has access to a repository that stores encryption keys and unique identifiers in associated pairs. This enables a recipient of an electronic message including encrypted content to use an authentication device as described herein to extract a unique identifier from the electronic message, communicate this to the server and receive in response a key suitable for decrypting the encrypted content of the electronic message.

Conversely, an encryption key suitable for encrypting content of an electronic message and a unique identifier associated with the message can be provided to the server for storing in association with one another for subsequent use by the message recipient to decrypt the encrypted message content.

Key exchange can occur over one or more secure channels between the authentication device and the server. The secure channel(s) may be established directly between the authentication device and the server, or the secure channel(s) may be established via the user device.

Embodiments herein provide an authentication device which can be used to authenticate a communication. The authentication device is an electronic device having a light sensor that may take any suitable form such as a light pen device which may also be used as a stylus, or other equivalent device. The authentication device is configured to sense a visual element displayed on a display screen. The visual element can include any element that is capable of encoding information in a manner that is receivable by a light sensor, and for example may include any combination of characters, symbols, and/or icons on a screen.

The authentication device may contain a secure element for securely storing sensitive information such as encryption keys. The authentication device includes a transmitter for communicating with a user device as described herein. The authentication device may also contain any combination of a display, a user input mechanism (for example, buttons, or a biometric sensor), and a battery. The authentication device may also be personalised to a particular user by use of biometric and/or secret information, such that a user can only operate the authentication device to encrypt/decrypt electronic messages upon successful entry of the biometric information and/or the secret information.

The authentication device is able to communicate with a secure server, perhaps via the user device (for example, a user's mobile phone) using an encrypted link over a short-range wireless link, such as, Bluetooth or NFC. Encrypted links are used to secure communications over a potentially untrusted channel that involves the user device.

Alternatively, or additionally the authentication device may be equipped with a transmitter/receiver for long-range communication, such as a wired connection, wireless radio such as WiFi, LTE, and/or 5G New Radio to communicate over a secure channel directly with the server.

The authentication device may take the form of a portable, pen-like device that is capable of being held by a user and transported with relative ease.

The authentication device transmits at least one cryptographic key and a unique identifier to the server in 'sender' mode and, responsive to transmission of a unique identifier, receives at least one cryptographic key from the server in 'receiver' mode. The at least one cryptographic key can be used directly to encrypt, decrypt, sign and/or authenticate messages, or the at least one cryptographic key can be used to generate one or more tokens to encrypt, decrypt, sign, and/or authenticate messages sent or received by the user device where the user device may be for example, the user's mobile phone. For example, each token can be a session key derived from the cryptographic key, with the token being used to encrypt the message.

Communication between the user device (for example, the user's mobile phone) and the authentication device is via two one-way links: the sensor of the authentication device is used to receive data at the authentication device from the user device via a downlink, the sensor for example, detecting light intensity on the screen of the user device, for example, by using the authentication device to scan images on the screen of the user device. Additionally, or alternatively the authentication device may be configured to detect light intensity modulations on the screen of the user device, for example a moving graphic such as a video, or modulation of the backlight of the screen. A separate one way short-range link, for example, Bluetooth and/or NFC is used for the uplink to transmit data from the authentication device to the user device. This avoids the possibility of exploiting the authentication device without user interaction to initiate processing, for example, all activity of the authentication device may be authorized using one of its buttons.

The authentication device may be used in the same manner as a light pen, exposing the sensor of the authentication device to light emitted by a display which is displaying a received secure message. An aspect of the message may cause the display to send a short burst of data about the message over a light channel to the authentication device, for example via a sprite. The authentication device may then display the received information about the message on a built in display, if one is present.

The authentication device is configured to scan a visual element of a received message using the light sensor. The scanned visual element encodes at least a message identifier. The authentication device transmits at least the message identifier regarding the received message to the server, perhaps via the user device over the short-range link server. Alternatively the authentication device is equipped with a transmitter/receiver for long-range communication, such as a wired connection, wireless radio such as WiFi, LTE, and/or 5G New Radio to communicate over a secure channel directly with the secure server.

For example, if the message is an email, the sender encrypts the email with a key from the sender's authentication device. The key and a corresponding unique identifier is stored by the server. When the receiver receives the sent email message at their user device, the received email message is displayed on a display of the receiver's user device. Displaying the email includes displaying the unique identifier, for example as an alphanumeric string in the subject field of the email. The receiver then uses their authentication device to scan the unique identifier on the display of the receiver's user device. The authentication device may apply optical character recognition techniques (OCR) as are known per se to interpret the alphanumeric string.

The receiver's authentication device transmits the unique identifier to the server, which performs a lookup and identifies the corresponding key stored in association with the unique identifier. This corresponding key is transmitted by the server to the receiver's authentication device, which then forwards the key on to the receiver's device for decrypting the encrypted portion of the email (e.g. an encrypted body of the email). The key is sent by the authentication device to the receiver's device over the direct wireless link.

It will be appreciated that email is just one example of an electronic message and equivalently the message may be an SMS or any other form of electronic messaging system. Additionally, the visual element is not limited to an alphanumeric string and other visual elements that are capable of encoding a unique identifier, such as a barcode or QR code, may alternatively be used.

Utilizing this system enables a sender to be confident that only the intended recipient can decrypt the content of their message in order to read it in plaintext form.

Optionally, the message recipient may scan a sender's identification with the authentication device, the sender's identification being included as part of the electronic message. In the case of an email, the sender identification can be the email address of the sender. In the case of an SMS, the sender identification can be a telephone number of the sender. Equivalent parameters in other electronic messaging systems will be apparent to a skilled person. The authentication device can transmit the scanned sender's identification to the server in conjunction with the unique identifier. The server can check whether the received sender's identification matches a stored sender's identification that is stored in a repository in conjunction with the unique identifier. In the case that the received sender's identification and the stored sender's identification do not match, the server can inform the recipient's authentication device that the sender of the electronic message as received by the recipient's device does not appear to be the original author of the electronic message. This may be useful in detection of fraudulent or spam-type messages, for example.

Turning now to the figures, FIG. 1 illustrates an exemplary user device 100 by which one or more aspects of the invention may be implemented. Although the user device 100 is presented in one arrangement, it should be clear that other embodiments may include additional or equivalent parts. The user device 100 may be a mobile phone or other mobile device.

The illustrated user device 100 generally includes a display 102, a transmitter/receiver 118, a messaging application 104, an encryption/decryption module 106, a storage module (not shown), a processor (not shown), and an input means such as a touch screen on the display 102 and/or buttons. The transmitter/receiver 118 is capable of long-range communication for example, wired internet connection, WiFi, LTE, and/or 5G New Radio. The transmitter/receiver 118 is also capable of short-range communication, for example, Bluetooth or NFC. The encryption/decryption module 106 is for encrypting messages which the user device is to send and decrypting messages which the user device has received.

The messaging application 104, may be a dedicated messaging application and/or an application which is capable of sending and receiving messages, for example, an email application, a web browser, a SMS application, and the like. In the exemplary case of an email application, a user can enter a receiver's email address 110 and a text body of an email 108 into the messaging application 104. The email message also contains a message field 112, e.g. a subject line, and encrypted content 116 generated by interaction with an authentication device as described herein. Encrypted content 116 may be all or part of the email body 108, for example. The content of the electronic message for encryption or decryption may generally referred to as a 'payload'. The email may also include a sender's email address 120. Equivalent fields in other forms of electronic message will be immediately apparent to a skilled person having the benefit of the present disclosure.

Figure 2:
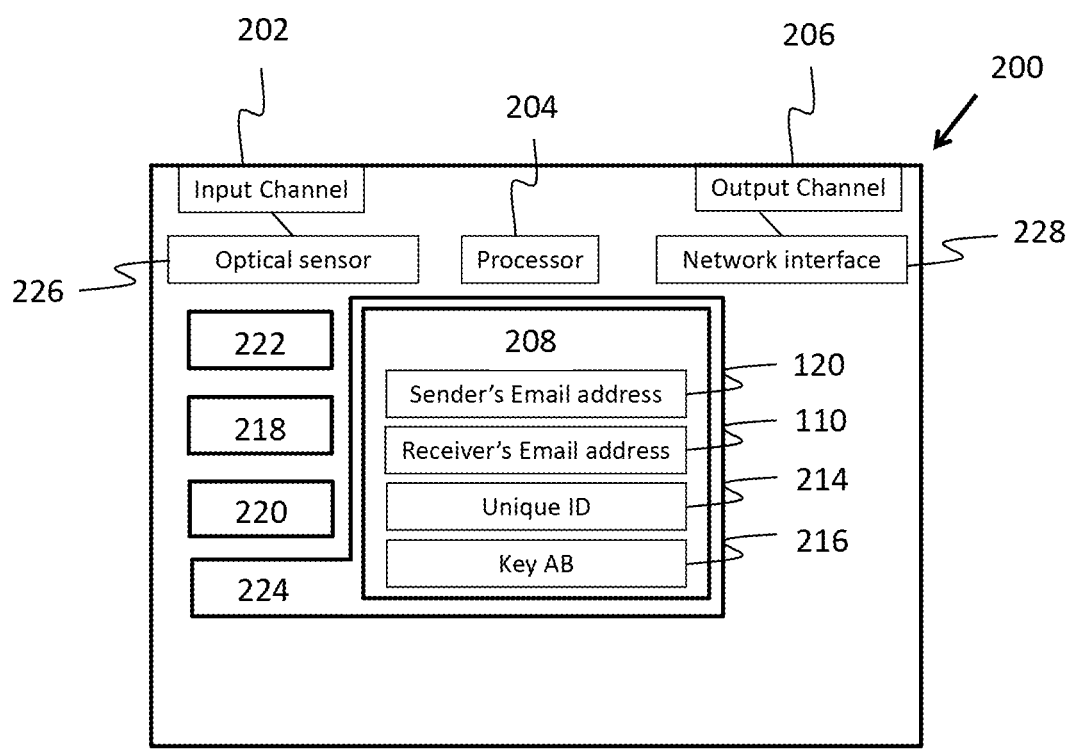
FIG. 2 is a block diagram illustrating an authentication device in accordance with exemplary embodiments.

FIG. 2 illustrates an exemplary authentication device 200 by which one or more aspects of the present invention may be implemented. Although the authentication device 200 is presented in one arrangement, it should be clear that other embodiments may include additional or equivalent parts. The authentication device 200 may be rugged and portable, fitting in a pocket, or a handbag. The authentication device 200 may be a pen, light pen, and/or stylus like device. Alternatively the authentication device 200 may be a smart phone, smart watch, a digital key card, or a point of sale terminal, where in each case the device has been modified to include a light sensor if necessary.

The illustrated authentication device 200 generally includes an input channel 202, a processor 204, an output channel 206, a transaction block 208, a storage medium 224, a processor 204, and an optical sensor 226. The input channel 202 of the authentication device 200 is an optical channel established using the optical sensor 226. The output channel 206 of the authentication device is a short-range communication uplink, for example, a Bluetooth or NFC link, established by a network interface 228, which may be e.g. a Bluetooth antenna or NFC antenna.

In a preferred configuration, the output channel 206 is a one way communication channel to user device 100. It should be appreciated that although both NFC and Bluetooth may require two way communication to establish a communication channel (e.g. during a pairing process), the data communicated on the established channel may be configured to only be allowed to be transmitted from the authentication device 200, i.e. authentication device 200 will not process any data from user device 100 or any other device that is transmitted over output channel 206. For example, the output channel 206 can operate to provide only acknowledgements that transmissions have been received, once the initial pairing and link keys have been established. It should also be appreciated that the authentication device 200 may be paired with the network device 100.

The processor 204 may be a secure microcontroller or an equivalent secure element such as a trusted execution environment (TEE). The processor 204 coordinates receiving information from the input channel 202 of the authentication device 200, storing information in the transaction block 208 and extracting information from the transaction block 208, and transmitting information on the output channel 206 of the authentication device 200. The processor 204 ensures security of the information received and transmitted from the authentication device 200.

The transaction block 208 is a data record stored in the storage medium 224 of the authentication device 200. The storage medium 224 may or may not be encrypted. The transaction block 208 comprises a unique ID 214, and a cryptographic key 216. Optionally, the transaction block 208 can include one or both of: a sender's identification 120, for example, a sender's email address or a sender's telephone number; and a receiver's identification 110, for example, a receiver's email address or a receiver's telephone number. The transaction block 208 may also contain additional data elements as required.

The unique ID 214 is unique to a given electronic message. When displayed on a display of a user's device, the unique ID 214 is presented as a visual element which may be an alphanumeric code, a QR code, a barcode, or the like. The unique ID may be stored in any suitable field of the electronic message, for example a subject line or a metadata tag which is attached to a respective message.

Alternatively, instead of being displayed directly as a visual element, the unique ID 214 may be encoded in a format suitable for display as a modulation in output of the user device's display. In this case an executable code module may be generated which causes a display 102 of the user device 100 to modulate emitted light at a desired frequency.

The authentication device 200 is configured to generate a unique ID and cryptographic key or token in response to an action indicating that a message is ready to be encrypted. For example, the cryptographic key or token may be a unique key, such as a one-time key or token, for each message. Additionally or alternatively, the cryptographic key or token may be derived from transaction dependent data, such as that used in an EMV transaction used to pay for a service. The action may be, for example, receipt of an input via input channel 202, which input may be a sender's identification such as a sender's email address. Alternatively, a button or other such user input mechanism forming part of the authentication device may be activated.

Optionally, the authentication device 200 also includes a transmitter/receiver 222 for long-range communication. The transmitter/receiver 222 may be a wired connection, WiFi, LTE, and/or 5G New Radio. If present, transmitter/receiver 222 enables the authentication device to communicate directly with the server without having to communicate via user device 100.

The authentication device 200 optionally comprises a screen 218 and/or a user input means 220. The screen 218 may display information pertinent to the encryption or decryption process as it occurs, for example the screen 218 may display a unique ID 244 or a status of input channel 202 and/or output channel 206. The user input means 220 may be buttons or a touchscreen. More complex user input into the authentication device may be made by using an on-screen keyboard.

The authentication device may additionally or alternatively comprise a biometric sensor, such as a fingerprint reader or face detection means such as a photo sensor, or the like. This enables the authentication device to be activated only by authorised user(s), whose biometric information is stored by the authentication device in transaction block 208.

In the case where the network interface 228 includes an NFC antenna, the authentication device 200 may use NFC technology for both communication to the network device and for charging where appropriate, for example, where the authentication device is a mobile type device. The authentication device may also utilize a charging stand, for example an inductive charging stand similar to those used for mobile phones or electric toothbrushes.

Authentication device 200 is configured to operate to encrypt and decrypt electronic messages as described later in this specification. Computer-readable instructions may be stored on a storage module of the authentication device for execution by processor 204, which instructions cause the processor 204 to control the authentication device to implement any and all aspects of the invention as described herein.

Figure 3:
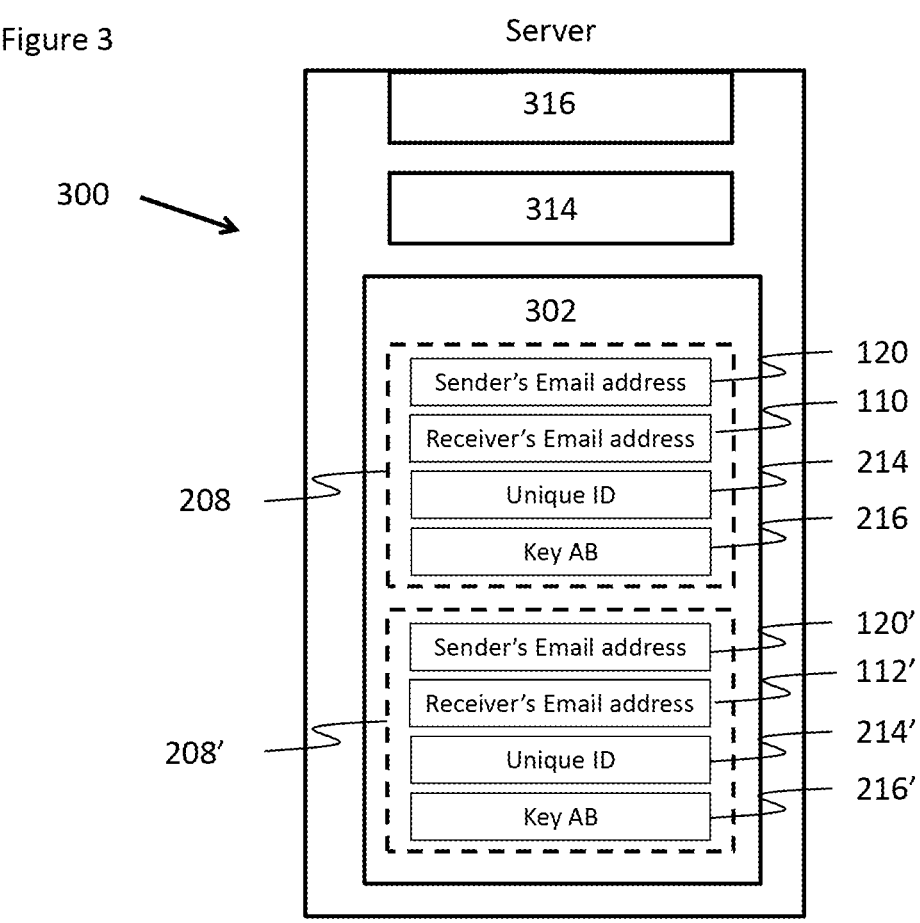
FIG. 3 is a block diagram illustrating a server in accordance with exemplary embodiments.

FIG. 3 illustrates an exemplary server 300 by which one or more aspects of the present invention may be implemented. Although the server 300 is presented in one arrangement, it should be clear that other embodiments may include additional or equivalent parts.

The server 300 generally includes a secure transaction block database 302, a processor 314, and a transmitter/receiver 316. The secure messaging provider 300 is capable of establishing a secure trusted communication channel with authentication device 200 via the transmitter/receiver 316, for example, a wired connection, wireless broadband, LTE and/or 5G New Radio connection. This channel may be established via user device 100, or it may be established directly with authentication device 200. In either case, the secure trusted communication channel may be established using trusted cryptographic links in the matter known in the art per se.

The server 300 stores a number of transaction blocks, for example, transaction blocks 208 and 208' in the secure transaction block database 302. Each transaction block 208 and 208' contains details of a respective electronic message received from the authentication device 200. In the illustrated embodiment the electronic message is an email and the transaction blocks each include a respective sender's email address 120, a respective receiver's email address 110, a respective unique ID 214, and a respective cryptographic key 216.

In the following scenario exemplified in FIGS. 4, 5 and 6, a sender sends a receiver an electronic message which is protected by an authentication device 200. The example of an email is used but a skilled person having the benefit of the present disclosure will be able to adapt the principles to other forms of electronic message such as SMS messages.

The sender and receiver each have a respective user device 100 (for example a mobile phone) capable of sending and receiving emails, hereafter termed the 'sender's device' and 'receiver's device'. The user devices 100 each also have the capability to encrypt and decrypt messages using a key provided over a short-range communication link by an authentication device 200, for example Bluetooth or NFC.

The sender and the receiver also each have a respective authentication device 200, which may be paired to the respective user device over the short-range communication channel. The authentication devices 200 are hereafter termed the 'sender's authentication device' and the 'receiver's authentication device'

Figure 4:
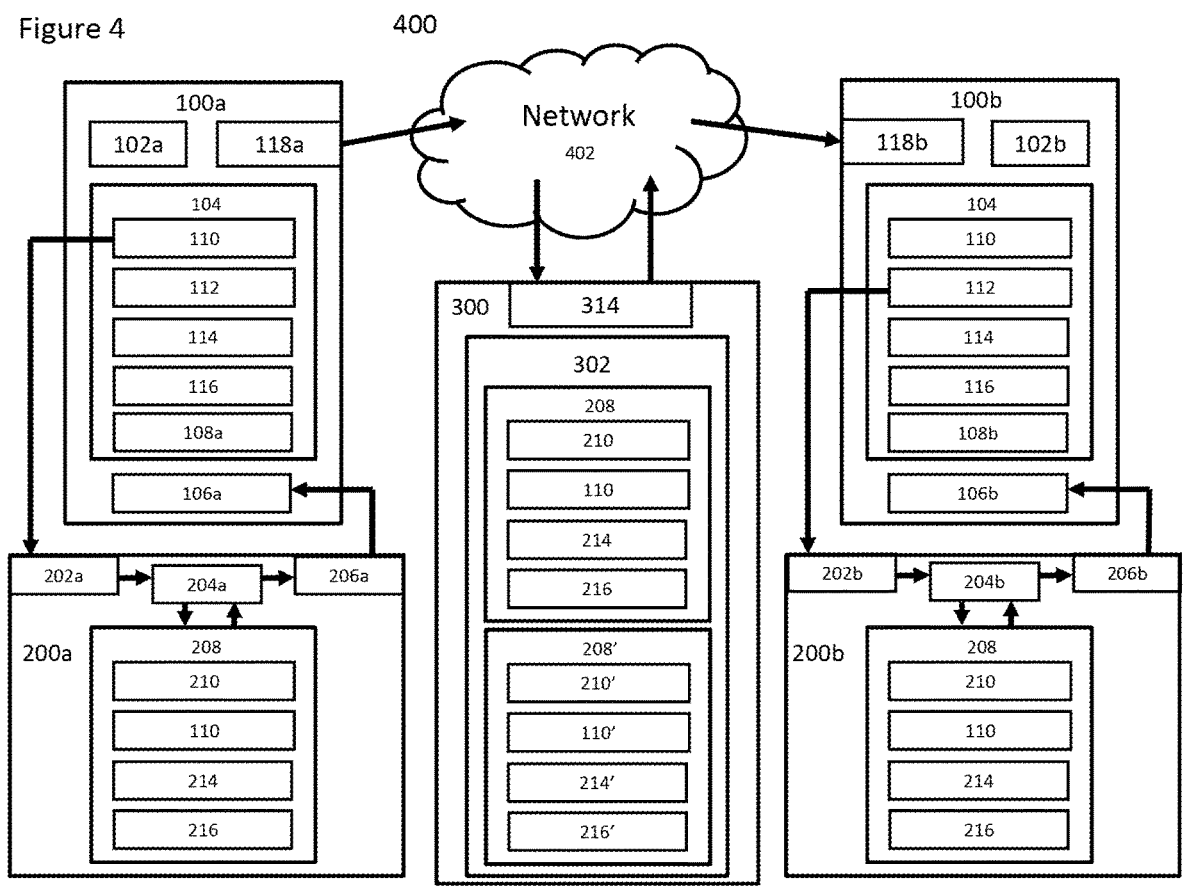
FIG. 4 is a block diagram illustrating a system for providing secure messaging in accordance with exemplary embodiments.

FIG. 4 illustrates an exemplary block diagram illustrating a system 400 for providing secure messaging in accordance with exemplary embodiments.

Although the system 400 is presented in one arrangement, it should be clear that other embodiments may include additional or equivalent parts.

The system 400 generally includes a sender's device 100a, a sender's authentication device 200a, a server 300, a network 402, a receiver's device 100b, and a receiver's authentication device 200b. The network 402 may be for example, the internet, a LAN, a WAN, or the like.

Figure 5:
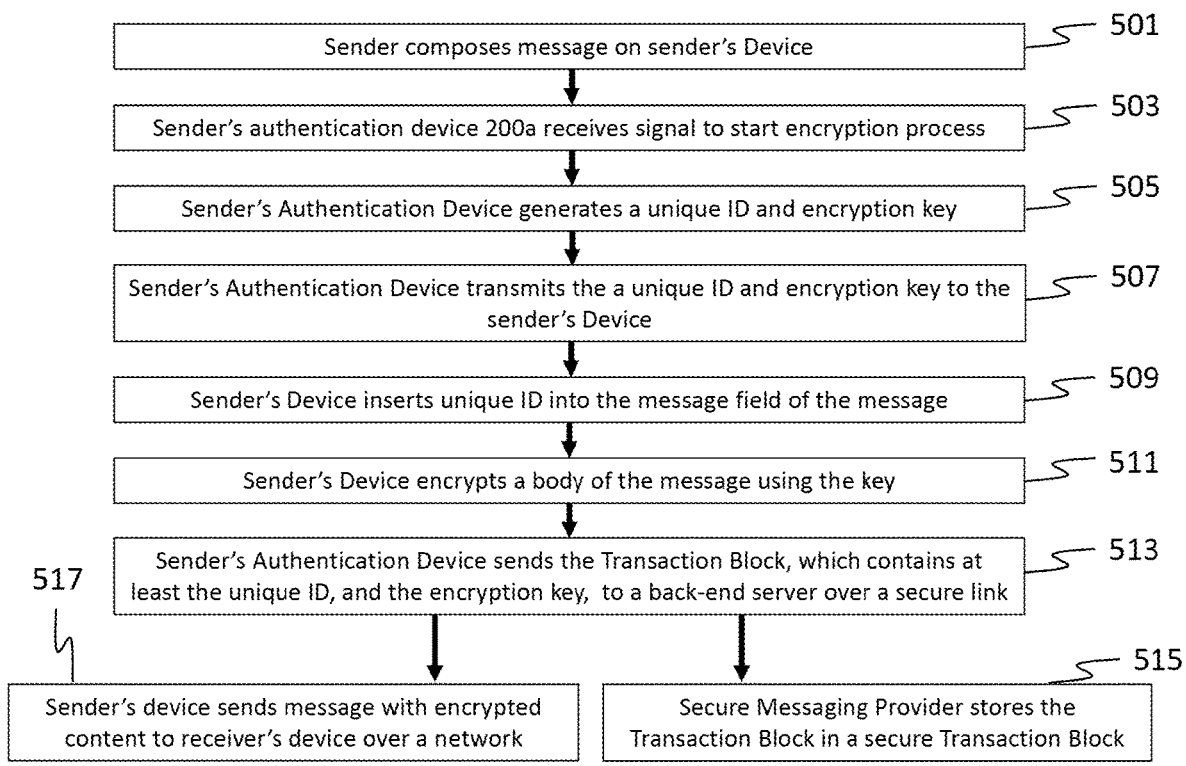
FIG. 5 is a flow chart illustrating a method of encrypting and sending an email using the authentication device.

FIG. 5 illustrates an exemplary flow chart illustrating a method of encrypting and sending an email using the sender's authentication device 200. Although the method is presented in one arrangement, it should be clear that other embodiments may include additional or equivalent steps.

In step 501, a sender composes an electronic message on the sender's device 100a. The message includes content that is to be encrypted, e.g. in the body of the message. The sender inputs a receiver's contact information 110, for example, an email address or a telephone number, into the messaging application 104 of the sender's device 100a and writes the body of an electronic message 108, for example, an email or short message service (SMS) message. As above, the following description is in the context of an email but the skilled person will readily adapt this disclosure to other forms of electronic message, including but not limited to SMS messages.

In step 503, the sender's authentication device 200a receives a start signal indicating that it is to start the encryption process, i.e. a signal that indicates that a message is to be encrypted. This signal may be, for example, optical input resulting from the sender scanning the receiver's email address 110, which is displayed on the display 102 of the sender's device 100a, with the input channel 202a of the sender's authentication device 200a. Alternatively, a button or similar user input means provided by the sender's authentication device 200a may be triggered by the sender.

In the case where the signal includes the receiver's email address 110, the transaction block 208 of the sender's authentication device 200a receives the receiver's email address 110 via the input channel 202 and microcontroller 204. The sender's email address 210 may also be stored by the sender's authentication device 200a, e.g. by scanning the sender's email address using the sender's authentication device. Alternatively, the sender's email address may be stored by the sender's authentication device 200a during an initial setup of the authentication device 200a. The sender's email address 210 may be input into the authentication device 200a using optional input means 220.

Optionally, to activate the sender's authentication device 200a, the sender may be required to provide user authentication to the sender's authentication device 200a. The user authentication may be provided by a PIN entered by the user using the user input 220 or from an on-screen keypad. Alternatively, or additionally the user authentication may be provided via the input channel 202 or with a different built-in sensor, for example a biometric sensor configured to detect a user's fingerprint, DNA, voice, or other parameter.

Alternatively, or additionally, the sender's authentication may be required by the sender's authentication device 200a, at a later step, for example, to generate the unique ID 214 and a cryptographic key 216.

In step 505, in response to the start signal the sender's authentication device 200a generates a unique ID 214 for the scanned message, and a cryptographic key 216 for encrypting the message. The unique ID 214 for the scanned message and the cryptographic key 216 are stored in the transaction block 208 of the sender's authentication device 200a. The cryptographic key 216 is used to generate tokens to encrypt, decrypt, sign, and/or authenticate messages sent or received by the network device where the network device may be for example, the user's mobile phone.

In step 507, the sender's authentication device 200a transmits the unique ID 214 and encryption key to the sender's device 100a over the short-range communication channel. In a preferred configuration the short-range communication channel is a data uplink channel only.

In step 509, in response to receiving the unique ID 214 from the sender's authentication device 200a, the sender's device 100a inserts the unique ID 214 into a message field 112 of the email message, for example the subject line of the email message.

In step 511, in response to receiving the encryption key 216 from the authentication device 200a, the encryption module 106 of the sender's device 100a encrypts content associated with the email, e.g. all or part of the body of the email 108, using the encryption key 216 and generates encrypted content 116.

In step 513, the sender's authentication device 200a sends the transaction block 208, which contains the unique ID 214, and the encryption key 216, and may optionally contain the sender's email address 210, the receiver's email address 110, to the server 300 over a secure link.

For this transmission, the transaction block 208 may first be transmitted to the sender's device 100a from the authentication device 200a over a secure link, the sender's device 100a may then transmit the transaction block 208 to the server 300 over a secure channel of the sender's network device 100a, which may be the same physical channel used to send the email by the sender's device, for example, a wired channel, wireless broadband, LTE and/or 5G New Radio connection.

Alternatively, or additionally the sender's authentication device 200a may transmit the transaction block 208 to the server 300 directly over a secure channel using its own long-range communication channel. In this manner the secure link of the authentication device 200 to the secure messaging provider 300 may be provided by the optional long-range communication channel of the authentication device 200.

In step 515, the server 300 stores the transaction block in a secure transaction block database managed by server 300. This may be, for example, a Cloud-based database.

In step 517, the sender's device sends the email to the receiver's device using the sender's network device 100a over the long-range communication channel.

Figure 6:
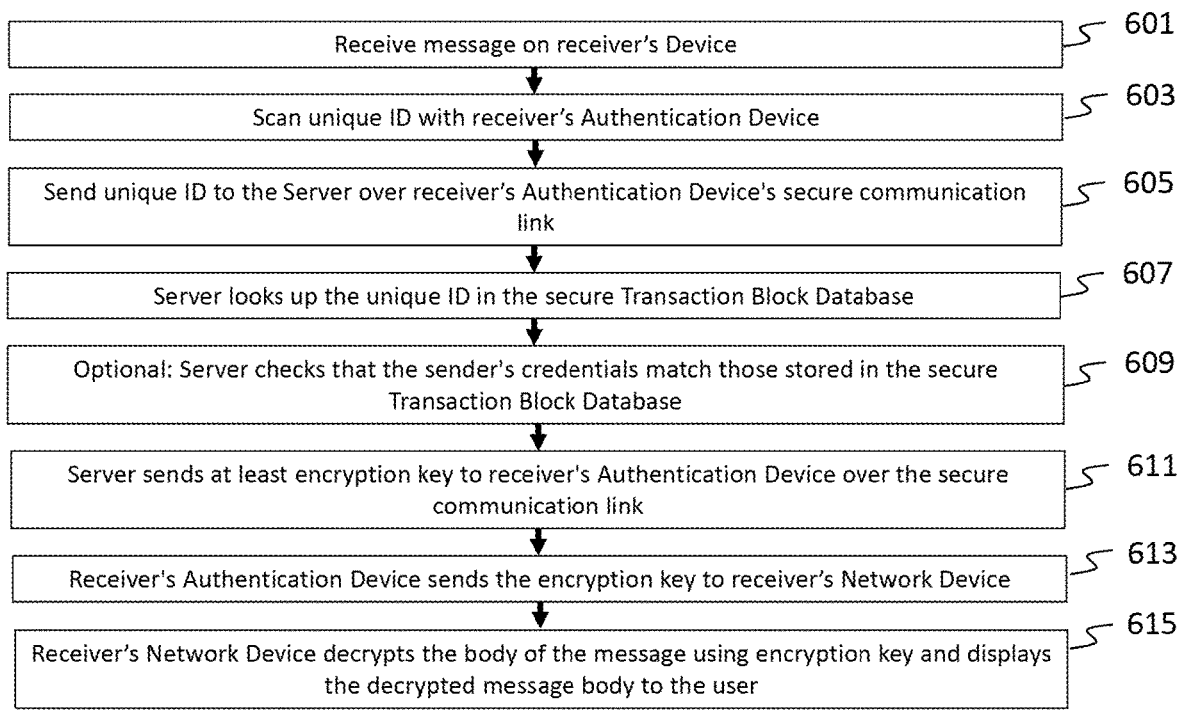
FIG. 6 is a flow chart illustrating a method of receiving and decrypting an email using the authentication device.

FIG. 6 illustrates an exemplary flow chart illustrating a method of receiving and decrypting an email using the authentication device 200. Although the method is presented in one arrangement, it should be clear that other embodiments may include additional or equivalent steps.

In step 601, the receiver receives the sent email at a receiver's device 100b.

In step 603, the receiver scans the unique ID 214 of the message with the light sensor of the receiver's authentication device. This may involve, for example, scanning the region of the display of the receiver's device that is displaying message field 112 of the email and performing optical character recognition on the resulting data to extract an alphanumeric unique ID. Other techniques for extracting information from the display of the receiver's device using the receiver's authentication device are within the scope of the invention.

In step 605, the receiver's authentication device 200b sends the unique ID 214 to the server 300 over a secure link of the receiver's authentication device 200b. For this transmission, the unique ID 214 may first be transmitted to the receiver's device 100b from the authentication device 200a over a secure link, the receiver's device 100b may then transmit the unique ID 214 to the server 300 over a secure channel of the receiver's device 100b, which may be the same physical channel used to receive the email, for example, a wired channel, wireless broadband, LTE and/or 5G New Radio connection.

Alternatively the receiver's authentication device 200b may transmit the unique ID 214 to the server 300 directly over a secure channel using its own long-range communication channel. In this manner the secure link of the authentication device 200 to the server 300 may be provided by the optional long-range communication channel of the authentication device 200.

In step 607, the secure messaging provider 300 looks up the received unique ID 214 that it received form the receiver's authentication device 200b in the secure transaction block database 302 to retrieve the corresponding transaction block 208.

Optionally, in step 609, the receiver's authentication device also transmits the sender's identification to the server 300. The sender's identification can be obtained, for example, in the same manner as the unique ID, i.e. scanning a region of the receiver's identification device displaying the sender's identification with the light sensor of the receiver's authentication device. If present, the server 300 checks that the sender's identification 210, for example the sender's email address, matches the sender's identification 210 stored in the respective transaction block record 208 of the secure transaction block database 302. In the event of a mismatch, the server 300 may inform the receiver's authentication device that the identity of the sender could not be verified.

In step 611, the secure messaging provider 300 sends the encryption key 216 associated with the corresponding transaction block 108 to the receiver's authentication device 100b over the secure communication channel. Other elements of the corresponding transaction block 108 may additionally be sent if desirable.

In step 613, the receiver's authentication device 200b sends the encryption key 216 which was received from the server 300 in transaction block 208 to the receiver's device 100b. The encryption key 216 is transmitted over the short-range communication link between the receiver's authentication device 200b and the receiver's device 100b.

In step 615, the receiver's network device 100b uses the encryption key 216 received from the receiver's authentication device 200b to decrypt the encrypted content and display the body of the email 108b to the receiver via display 102.

Other embodiments will be apparent to those skilled in the art from consideration of the specification and practice of the embodiments disclosed herein. It is intended that the specification and examples be considered as exemplary only.

In addition, where this application has listed the steps of a method or procedure in a specific order, it could be possible, or even expedient in certain circumstances, to change the order in which some steps are performed, and it is intended that the particular steps of the method or procedure claims set forth herein not be construed as being order-specific unless such order specificity is expressly stated in the claim. That is, the operations/steps may be performed in any order, unless otherwise specified, and embodiments may include additional or fewer operations/steps than those disclosed herein. It is further contemplated that executing or performing a particular operation/step before, contemporaneously with, or after another operation is in accordance with the described embodiments.

The methods described herein may be encoded as executable instructions embodied in a computer readable medium, including, without limitation, non-transitory computer-readable storage, a storage device, and/or a memory device. Such instructions, when executed by a processor (or one or more computers, processors, and/or other devices) cause the processor (the one or more computers, processors, and/or other devices) to perform at least a portion of the methods described herein. A non-transitory computer-readable storage medium includes, but is not limited to, volatile memory, non-volatile memory, magnetic and optical storage devices such as disk drives, magnetic tape, compact discs (CDs), digital versatile discs (DVDs), or other media that are capable of storing code and/or data.

Where a processor is referred to herein, this is to be understood to refer to a single processor or multiple processors operably connected to one another. Similarly, where a memory is referred to herein, this is to be understood to refer to a single memory or multiple memories operably connected to one another.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded computer devices, personal computers, server computers (specific or cloud (virtual) servers), hand-held or laptop devices, multiprocessor systems, microprocessor-based systems, set top boxes, programmable consumer electronics, mobile telephones, network personal computers (PCs), minicomputers, mainframe computers, distributed computing environments that include any of the above systems or devices, and the like. Hardware modules or apparatuses described in this disclosure include, but are not limited to, application-specific integrated circuits (ASICs), field-programmable gate arrays (FPGAs), dedicated or shared processors, and/or other hardware modules or apparatuses.

User devices can include, without limitation, static user devices such as PCs and mobile user devices such as smartphones, tablets, laptops and smartwatches.

Receivers and transmitters as described herein may be standalone or may be comprised in transceivers. A communication link as described herein comprises at least one transmitter capable of transmitting data to at least one receiver over one or more wired or wireless communication channels. Such a communication link can optionally further comprise one or more relaying transceivers. In a preferred configuration, once a communication link has been established for the short-range communication links described above, the transmitters and receivers may be configured to provide only one way communication.

User input devices can include, without limitation, microphones, buttons, keypads, touchscreens, touchpads, trackballs, joysticks and mice. User output devices can include, without limitation, speakers, buzzers, display screens, projectors, indicator lights, haptic feedback devices and refreshable braille displays. User interface devices can comprise one or more user input devices, one or more user output devices, or both.

The invention claimed is:

1. An authentication device comprising:
a light sensor;
a transmitter;
wherein the authentication device is configured to:
receive a unique identifier from a user device by sensing, with the light sensor, a visual element encoding the unique identifier that is displayed on a display of the user device;
transmit, to a server, the unique identifier;
receive, from the server, a cryptographic key corresponding to the unique identifier; and
transmit, with the transmitter to the user device, the cryptographic key for decryption of an electronic message corresponding to the unique identifier;
the authentication device further comprising:

a user input device for receiving biometric information and/or a secret code from a user, wherein the authentication device is configured to prevent transmission of the unique identifier to the server until a valid biometric information and/or a valid secret code is entered in the user input device.

2. The authentication device of claim 1, wherein the transmitter is configured to establish a one way communication channel with the user device.

3. An authentication device comprising:
a light sensor; and
a transmitter;
wherein the authentication device is configured to:
receive a unique identifier from a user device by sensing, with the light sensor, a visual element encoding the unique identifier that is displayed on a display of the user device;
transmit, to a server, the unique identifier;
receive, from the server, a cryptographic key corresponding to the unique identifier;
transmit, with the transmitter to the user device, the cryptographic key for decryption of an electronic message corresponding to the unique identifier;
receive a sender's identification by scanning a second visual element encoding the sender's identification that is displayed on the display of the user device; and
transmit, to the server, the sender's identification.

4. The authentication device of claim 3, wherein the authentication device and the user device are paired.

5. A computer-implemented method for encrypting an electronic message, comprising:
receiving a receiver's identification at an authentication device from a user device by sensing, with a light sensor of the authentication device, a visual element of the electronic message that is displayed on a display of the user device, the visual element encoding the receiver's identification;
generating, at the authentication device, a cryptographic key and a unique identifier;
transmitting, by the authentication device, the cryptographic key and the unique identifier to the user device for encryption of the electronic message;
transmitting, by the authentication device and over a secure channel, the cryptographic key, the unique identifier and the receiver's identification to a server;
receiving, by the user device, the cryptographic key and the unique identifier from the authentication device;
encrypting, by the user device and using the cryptographic key, a payload of the electronic message to generate an encrypted electronic message;
inserting, by the user device, a second visual element into the encrypted electronic message, the second visual element encoding the unique identifier; and
transmitting, by the user device, the encrypted electronic message to a receiver associated with the receiver's identification.

6. The computer-implemented method of claim 5, wherein transmitting the cryptographic key and the unique identifier to the user device is over a one way channel.

7. A computer-implemented method for decrypting an electronic message, comprising:
(a) receiving a unique identifier from a user device by sensing, with a light sensor of an authentication device, a visual element of the electronic message that encodes the unique identifier and which is displayed on a display of the user device;
(b) transmitting the received unique identifier, by the authentication device, over a secure channel to a server;
(c) receiving, by the authentication device, a cryptographic key over the secure channel from the server, the cryptographic key corresponding to the unique identifier;
(d) transmitting, by the authentication device, the cryptographic key to the user device for decryption of the electronic message; and
before operation a) or operation b):
receiving, via a user input device of the authentication device, biometric information and/or a secret code from a user;
determining, by the authentication device, whether the biometric information and/or the secret code corresponds to an authorized user; and
in the negative, aborting the decryption of the electronic message.

8. The computer-implemented method of claim 7, further comprising:
receiving, by the user device, the cryptographic key from the authentication device; and
decrypting an encrypted payload of the electronic message using the cryptographic key.

9. The computer-implemented method of claim 7, further comprising:
receiving, by the server, the unique identifier from the authentication device;
identifying, in a database, a transaction block containing the unique identifier; and
transmitting, by the server and to the authentication device, the cryptographic key stored in the transaction block.

* * * * *